Figure 5:
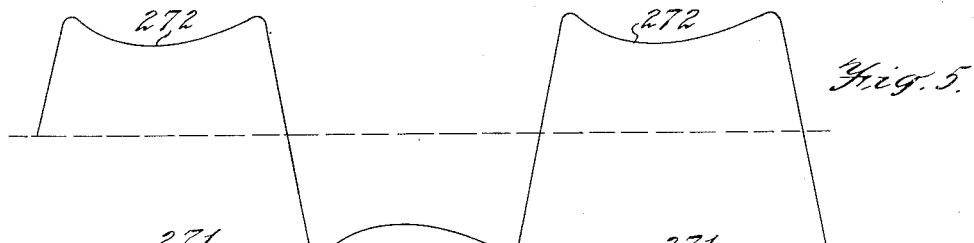

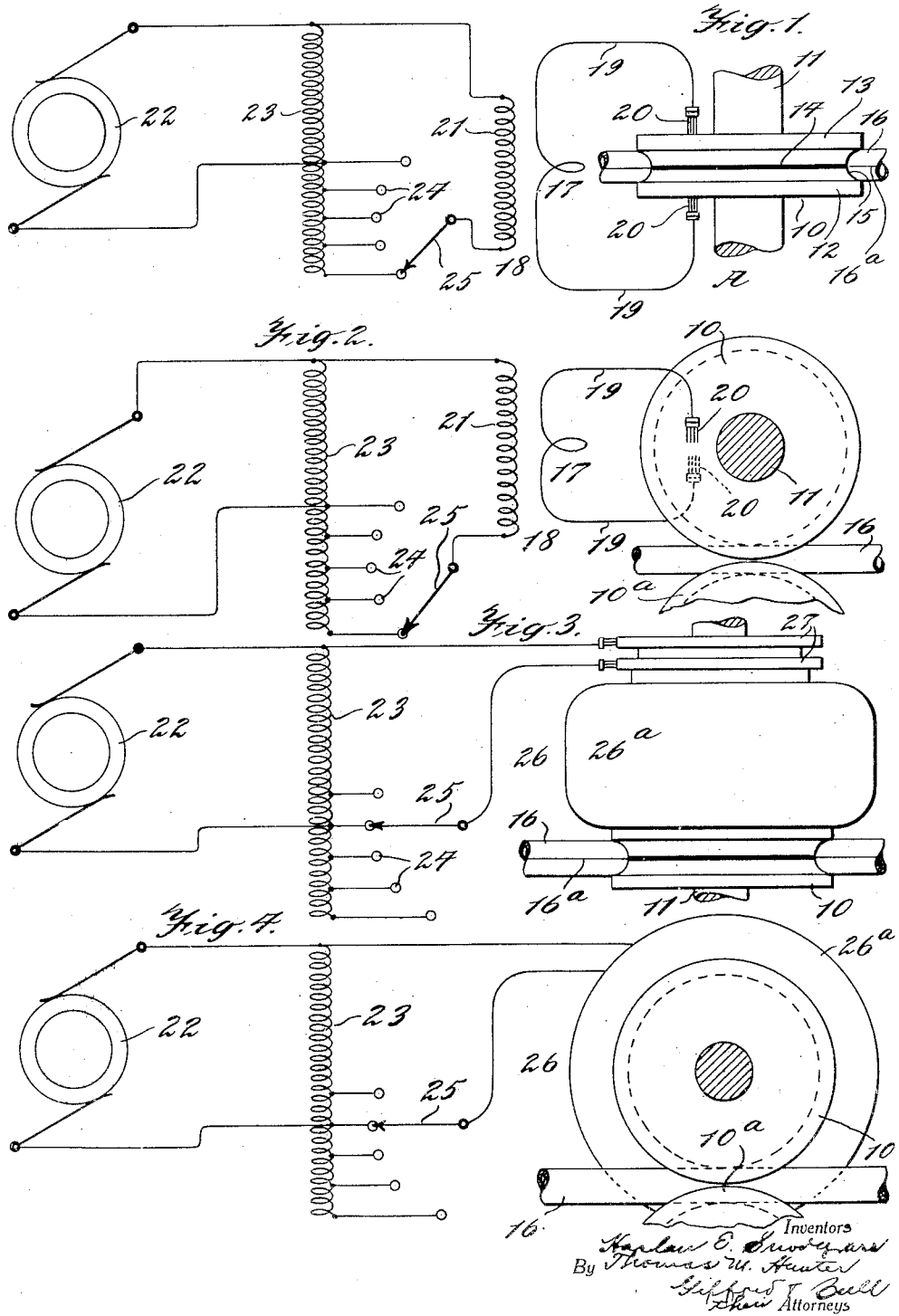

Dec. 18, 1923.

H. E. SNODGRASS ET AL 1,478,302

METHOD OF AND APPARATUS FOR ELECTRIC WELDING

Filed March 29, 1922   2 Sheets-Sheet 2

Inventors

Patented Dec. 18, 1923.

1,478,302

UNITED STATES PATENT OFFICE.

HARLAN E. SNODGRASS, OF SUMMIT, AND THOMAS M. HUNTER, OF NEWARK, NEW JERSEY, ASSIGNORS, BY MESNE ASSIGNMENTS, TO NEWARK TUBE COMPANY, OF NEWARK, NEW JERSEY, A CORPORATION OF NEW JERSEY.

METHOD OF AND APPARATUS FOR ELECTRIC WELDING.

Application filed March 29, 1922. Serial No. 547,635.

*To all whom it may concern:*

Be it known that we, HARLAN E. SNODGRASS and THOMAS M. HUNTER, citizens of the United States, residing at Summit, in the county of Union and State of New Jersey, and Newark, in the county of Essex and State of New Jersey, respectively, have invented certain new and useful Improvements in Methods of and Apparatus for Electric Welding, of which the following is a specification.

Our invention more particularly relates to a method and apparatus for welding by the use of an alternating current. In resistance welding with alternating currents using an ordinary sine wave, such as has heretofore been common, there is the difficulty that separated parts only of the work will be welded by the tops of the successive waves, while other parts of the work will either not be welded at all by lower portions of the current waves, or such other portions will have only a very inferior weld. This difficulty is particularly pronounced in tube welding, where an alternating current is passed across the seam in order to weld together the abutting edges of the tube. Tubes welded in this manner present, along the seam, re-current welded portions and a correspondingly inferior product, which, while useful where it is not necessary that the seam should be air or water-tight and where the tube is not subjected to mechanical forces, is not useful where a welded seam is required that will not leak, as, for example, in water and oil tanks, and where the seam is subjected to air or steam pressures, or where the work is subjected to mechanical forces, as, for example, where welded seamed tubes are subjected to a bending, expanding, flanging or feathering operation such as is frequently necessary. Furthermore, the welding processes as carried out with substantially sine wave alternating currents are inherently slow. For example, with ordinary welding operations, with alternating current of sixty cycles sine wave form, the work may be passed through the machine at, say, sixty feet a minute. Any attempt to increase the speed will merely result in a weld that will be still further defective, or the tube may not be welded at all. On the other hand, if it is attempted to increase the welding current, then the seam will be burned by the top portions of the current waves.

In accordance with our invention, the foregoing difficulties have been overcome, or largely overcome, by carrying out the welding operation with a current and voltage having flat top wave characteristics, which produce a flat top power wave. By the use of a welding current of this character, the speed of the welding operation may be greatly increased and the quality of the product greatly improved. The speed of the operation may be still further increased by increasing the frequency above that which has hitherto been commonly employed; that is, above sixty cycles.

In the accompanying drawings we have illustrated two different types of apparatus for carrying out our invention, it being understood that any suitable means for producing a welding current having a flat top wave characteristic may be employed.

Figure 6:
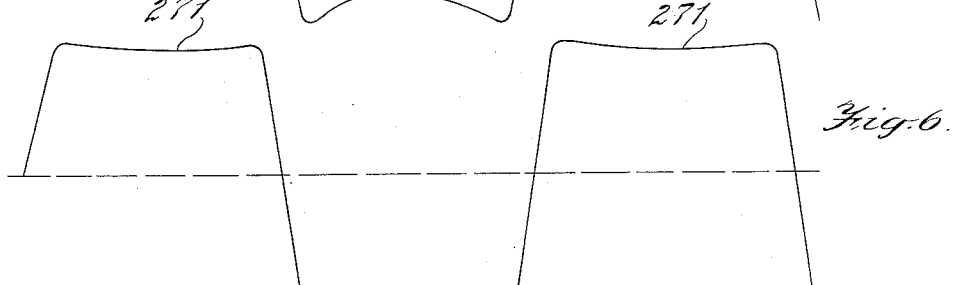
Figure 7:
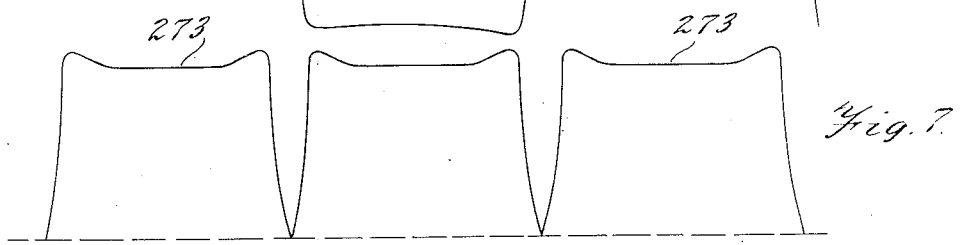
Figure 8:
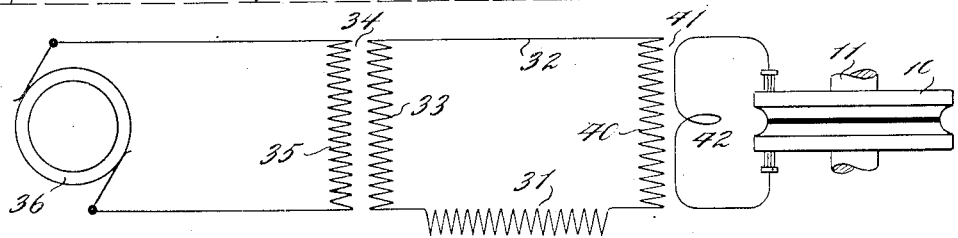
Figure 9:
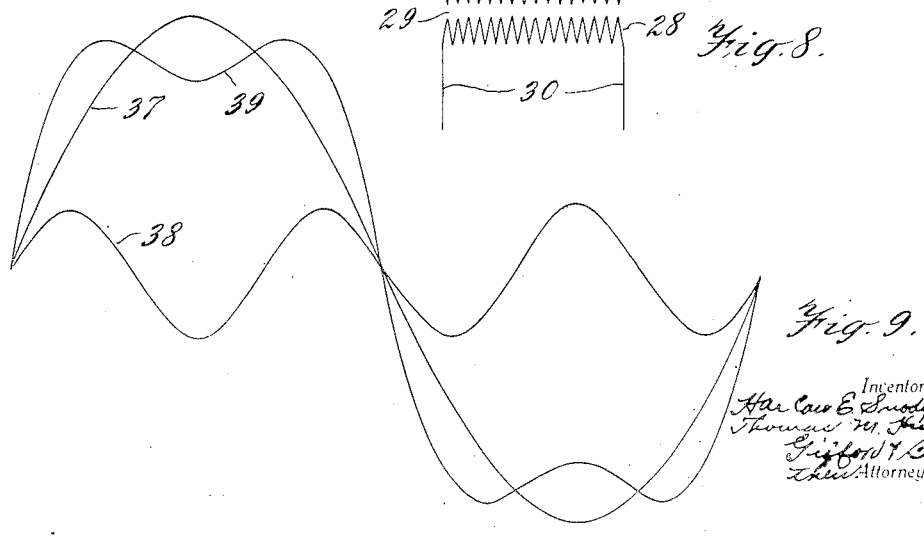

Our invention will best be understood by reference to the accompanying drawings, in which Figure 1 is a view illustrating diagrammatically an apparatus for carrying out our invention, in which is employed a generator which produces a flat top current wave and a stationary transformer, the welding roll and associated parts being shown in plan view; Fig. 2 is a view similar to Fig. 1, showing the welding roll and associated parts in sectional side elevation; Fig. 3 is a view similar to Fig. 1, illustrating an apparatus comprising a rotary transformer for carrying out the welding operation, the welding apparatus being shown in plan view; Fig. 4 is a view similar to Fig. 3, illustrating the welding apparatus in sectional side elevation; Figs. 5 and 6 show voltage and current waves, respectively, produced by the generator illustrated in Figs. 1 to 4; Fig. 7 illustrates a power curve of substantially the form produced by the current curve of Fig. 5 and the voltage curve of Fig. 6; Fig. 8 is a diagrammatic view illustrating another means for producing a flat top current wave and the associated welding apparatus in plan view, and Fig. 9 shows the voltage waves impressed upon the primary of the welding transformer of Fig. 9.

Like reference characters indicate like parts thoughout the various views.

Referring, now, to the drawings, in which we have illustrated the preferred form of devices for carrying out the invention, and first to Fig. 1, 10 is a welding roll mounted on a shaft 11 and comprising two contact members 12 and 13, each separated by an insulating member 14, the adjacent portions of the two contact members being recessed at their peripheries to form, combined, a groove 15, preferably substantially semi-circular in section, in which groove is received the tubes 16 to be welded, it being understood that the seam 16a registers with the insulating member 14 which separates the two contact members. A lower grooved roll 10a preferably engages the tube on the lower side thereof, and which, with the welding roll, forms a welding opening through which the tube passes, the rolls serving to maintain the edges of the tube on opposite sides of the seam in abutting engagement while welding current is passed across the seam. In the form shown in Figs. 1 and 2, current is supplied to the two contact members 12 and 13 by the secondary 17 of a transformer 18, the secondary being connected by conductors 19 to brushes 20, the parts illustrating in a diagrammatic manner any known means for conveying current from the secondary of a stationary transformer to the respective contact members of the welding roll. The primary 21 of the transformer 18 is connected to the generator 22, which is designed, in a known manner, to produce a current having a flat top wave. Preferably a regulating transformer 23 is interposed between the generator 22 and the primary 21 of the transformer 18, the regulating transformer being provided with a plurality of taps 24, with which cooperate a switch arm 25 to regulate the welding voltage, and correspondingly the welding current, in a well known manner.

In Fig. 3 we have illustrated our invention in conjunction with a rotary transformer 26, which may be similar in construction and operation to the rotatable transformer shown in our copending application Serial No. 446,050, which was filed on or about February 18, 1921, and which need not be further described. It is pointed out, however, that collecting rings 27 are preferably mounted on the shaft 11 adjacent to the rotary transformer, which convey current from the generating circuit to the conductors leading to the primary transformer. The welding roll 10 is also preferably mounted by the side of the transformer and rotates therewith. The terminals of the secondary formed by the shell 26a of the transformer are connected to the respective contact members of the welding roll 10.

Since the welding heat, other factors being constant, is porportional to the welding current, and since the instantaneous values of the flat top welding current wave 271 of Fig. 6 produced by the voltage wave 272 of Fig. 5, which is used in accordance with our invention, are substantially the same throughout practically the entire wave period, and produce a substantially flat top power curve 273, as shown in Fig. 7, it will be apparent that the weld will be practically uniform, thereby greatly improving the welded product, and facilitating the welding operation by making it possible to carry out the same at a greater speed. The speed of the welding operation may still further be increased by increasing the frequency of the alternating current, which promotes the uniformity of the weld, so that an increase of frequency above the sixty cycles usually employed, is particularly useful with a flat top welding current wave.

In Fig. 8 we have illustrated another embodiment of our invention, in which voltage waves of different frequencies are impressed upon the welding circuit to produce a welding current having a flat top wave. The primary 28 of the transformer 29 may be connected to a supply circuit 30 of a given frequency, for example, sixty cycles, the secondary 31 of the transformer being included in the circuit 32. Included in this same circuit is the secondary 33 of another transformer 34, the primary 35 of which is connected to the terminals of an alternating current generator 36 of a different frequency from the supply circuit 30, and preferably of a higher frequency. For example, assuming that the supply circuit 30 is sixty cycles, then the generator 36 may generate a current of one hundred and eighty cycles, a frequency three times that of the supply circuit. Referring, now, to Fig. 9, the curve 37 represents the voltage wave impressed upon the circuit 32 by the secondary 31 from the supply circuit 30. The curve 38 represents the voltage curve impressed upon the circuit 32 by the secondary 33 of the transformer 34. The curve 39 represents the resultant of the two curves 37 and 38, and would be the voltage impressed on the primary 40 of the welding transformer 41. A voltage wave of similar form would be induced in the secondary 43, which is connected to the welding roll 10 in the same manner as that shown in Fig. 1. The current wave resulting from the voltage wave 39 is substantially the same as that shown in Fig. 6, and the power wave is substantially the same as that of Fig. 7.

What we claim and desire to secure by Letters Patent of the United States is:

1. The method of welding a metallic seam, which consists in passing across the seam an alternating current having a substantially flat top current wave.

2. The method of welding seamed tubes having their edges in abutting engagement, which consists in passing across the seam of the tube an alternating current having a substantially flat top current wave.

3. The method of welding seamed tubes having their edges in abutting engagement, which consists in passing across the seam of the tube an alternating current having a substantially flat top current wave, and progressively feeding forwardly the tube at such a rate as to produce a substantially continuous weld.

4. The method of welding seamed tubes having their edges in abutting engagement, which consists in passing across the seam of the tube an alternating current having a substantially flat top current wave and a frequency greater than sixty.

5. The method of welding seamed tubes which consists in passing the tube through a welding opening with the edges on either side of the seam in abutting engagement, and passing across the seam a substantially flat top current wave.

6. The method of welding seamed tubes which consists in passing the tube through a welding opening with the edges on either side of the seam in abutting engagement, passing across the seam a substantially flat top current wave, and progressively moving the tube through the opening at such a rate as to produce a substantially continuous weld.

7. The method of welding seamed tubes which consists in passing the tube through a welding opening with the edges on either side of the seam in abutting engagement, and impressing across the seam the resultant voltage of voltages of different frequencies, thereby causing a substantially flat top current wave to flow across the seam.

8. The method of welding seamed tubes which consists in passing the tube through a welding opening with the edges on either side of the seam in abutting engagement, impressing across the seam the resultant voltage of voltages of different frequencies, thereby causing a substantially flat top current wave to flow across the seam, and progressively moving the tube through the opening at such a rate as to produce a substantially continuous weld.

9. The method of welding a metallic seam which consists in passing across the seam an alternating current producing substantially constant power throughout a given half cycle of the alternating current.

10. The method of welding a metallic seam which consists in passing across the seam successive pulsations of electric power substantially constant throughout the period of each pulsation.

11. In a welding system, means for passing across a seam a welding current, and means for supplying to the welding apparatus a welding current having a substantially flat top wave.

12. In a welding system for welding seamed tubes, a welding apparatus forming a welding opening through which a seamed tube is adapted to pass, and constructed and arranged to pass a welding current across the seam, and means for supplying to the welding apparatus an alternating current having a substantially flat top current wave.

13. In a welding system for welding seamed tubes, a welding apparatus forming a welding opening through which a seamed tube is adapted to pass, and constructed and arranged to pass a welding current across the seam, means for supplying to the welding apparatus an alternating current having a substantially flat top current wave, and means for moving the tube through said opening at such a rate as to produce a substantially continuous weld.

14. In a welding system for welding seamed tubes, a welding apparatus comprising a welding roll and a transformer rotatable therewith, and means for supplying to said welding apparatus a welding current having a substantially flat top current wave.

15. In a welding system for welding seamed tubes, a welding apparatus comprising a rotatable transformer, a welding roll rotatable therewith and having two insulated contact members engaging the tube on opposite sides of the seam thereof, the secondary of said rotary transformer being connected to said contact members, and means for impressing upon the primary of said transformer an alternating current having a substantially flat top current wave.

16. In a welding apparatus for welding a seamed member, contact members for engaging the metal on opposite sides of the seam, and means for supplying to said contact members an alternating current having a substantially flat top current wave, said means comprising an electric circuit upon which are impressed alternating voltages of different frequencies.

17. In a welding system including two transformers, a circuit including the secondaries of said transformers, means for impressing upon the primaries of said transformers alternating voltages of different frequencies, whereby a substantially flat top current wave is induced in said circuit, and means for supplying to the welding apparatus from said circuit a flat top wave welding current.

HARLAN E. SNODGRASS.
THOMAS M. HUNTER.